(No Model.)
T. B. JEFFERY.
VELOCIPEDE SADDLE.
No. 354,907. Patented Dec. 28, 1886.
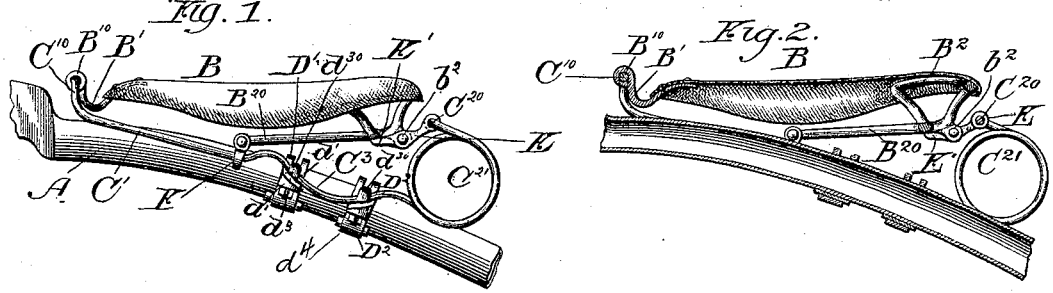
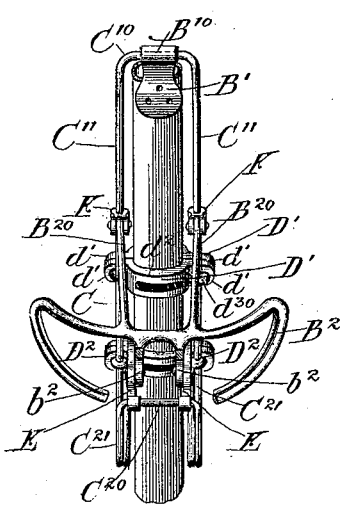
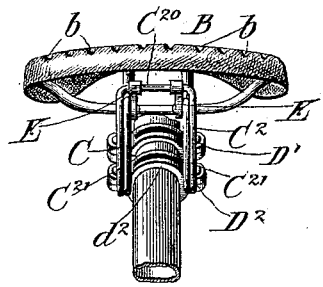
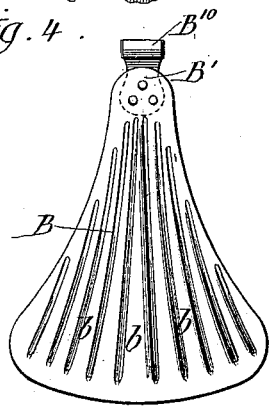
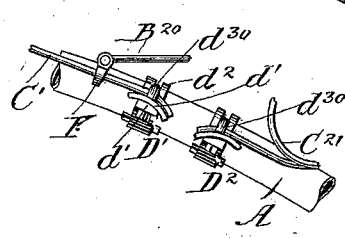
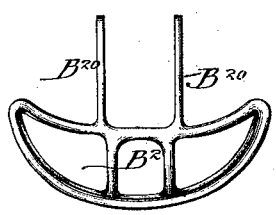
Witnesses:
Frank J. Blanchard
William T. Weimers
Inventor:
Thos. B. Jeffery
By Chas. S. Burton
Attorney.

UNITED STATES PATENT OFFICE.

THOMAS B. JEFFERY, OF CHICAGO, ILLINOIS.

VELOCIPEDE-SADDLE.

SPECIFICATION forming part of Letters Patent No. 354,907, dated December 28, 1886.

Application filed April 17, 1886. Serial No. 199,217. (No model.)

*To all whom it may concern:*

Be it known that I, THOMAS B. JEFFERY, a citizen of the United States, residing at Chicago, in the county of Cook and State of Illinois, have invented certain new and useful Improvements in Velocipede-Saddles, which are fully set forth in the following specification, reference being had to the accompanying drawings, forming a part thereof, wherein—

Figure 1 is a side elevation. Fig. 2 is a vertical longitudinal section. Fig. 3 is a plan with the seat removed. Fig. 4 is a plan of the seat. Fig. 5 is a rear elevation. Fig. 6 is a detail plan of the rear stretcher.

A is the upper part of the frame of a velocipede, otherwise called the "perch."

B is the seat, which is made of flexible material, usually leather.

C is a spring-saddle support. It may be in one piece, as in Fig. 1, or in two parts, as seen in Fig. 7. The front part, $C'$, is hereinafter called the "forward" spring or support, and the rear part, $C^2$, is called the "rear" spring. The description, when speaking of them as separate parts, will be understood to refer to the form shown in Fig. 7. The forward spring, $C'$, is bent into the loop $C^{10}$, over the perch in front of the saddle, and the side branches, $C^{11}$ $C^{11}$, extend alongside the backbone A under the seat, and are fastened in the clamps $D'$ $D'$. The rear spring, $C^2$, is bent into a loop, $C^{20}$, above the backbone in the rear of the seat, and each branch is coiled into a spring, $C^{21}$, one on each side of the backbone A, and thence the ends extend forward under the seat alongside the backbone, and are secured in the clamps $D^2$ $D^2$.

To the forward end of the seat B is fastened the front stretcher or frame, $B'$, which is formed with the eye or hook $B^{10}$, by which it is pivoted on the loop $C^{10}$ of the forward spring, $C'$. To the rear end of the seat B is secured the rear stretcher or frame, $B^2$, to the lower rear part of which, as at the lugs $b^2$, are connected the links E, which in turn are connected at the rear end to the loop $C^{20}$ of the rear spring, $C^2$. The links E have the forward extensions, $E'$, which abut against the under side of the frame $B^2$. Said frame or stretcher $B^2$ has the branches $B^{20}$ extended forward underneath the seat B, and at their forward ends supported on the lateral branches $C^{11}$ of the forward support, $C'$. Preferably, in order to keep the parts in proper relation, eyes F F are provided, sliding on the side branches, $C^{11}$, and to them the extensions $B^{20}$ are pivoted.

The clamps $D'$ and $D^2$ are precisely alike. Description of $D'$ will suffice. The two members $D'$ $D'$ are alike, each formed with the lugs $d'$ $d'$ at the sides of the groove or bend $d^2$, which fits the backbone A, and the two members are clamped together, embracing the backbone by means of the bolts $d^3$ $d^3$, inserted through the mated lugs $d'$ $d'$. The head of each of said bolts is in the form of an eye, $d^{30}$, through which the side bars, $C^{11}$ $C^{11}$, are inserted, so that when the nuts $d^4$ $d^4$ are set up to clamp the members $D'$ $D'$ onto the backbone the same process also clamps the side bars, $C^{11}$ $C^{11}$, upon the lugs $d'$ of the upper clamp, $D'$. When the front and rear supports, $C'$ and $C^2$, are made in one piece, I prefer to make them with the part $C^3$ to be embraced by the clamps $D'$ $D^2$, said part being formed in a curve of short radius, and preferably about a center located about at the level of the seat. The bearing of the support in the clamps may be similarly curved; but this is not essential. When the support is in two pieces, as in Fig. 7, the ends embraced in the clamps are curved, as shown, and in this form it is desirable that the bearing-lugs $d'$ should also be curved. By means of this curvature the inclination of the seat may be altered by sliding the said curved portion $C^3$ or curved ends $c^3$ $c^3$ through the clamps before tightening them. Moreover, the spread of the support—that is, the distance between the front and rear points of suspension of the seat—as well as the tension of the coil-spring $C^{21}$, may be varied by varying the distance between the clamps $D'$ $D^2$, such change tending to straighten out or bend into a shorter curve the curved part $C^3$; and the same result is caused when the supports are in two pieces, as in Fig. 7, either by as above or by varying the distance between the ends $c^3$ $c^3$. Furthermore, by moving the two clamps (or the two supports when they are divided) equally in opposite directions, the said change of tension will be effected without changing the inclination or mean position of the seat, and by moving them equally in the same direction the mean position of the seat may be changed without changing either the tension or the inclination. Thus three independent adjustments are obtained, so that within limits the seat may be given any inclination at any tension and in any mean position on the perch.

The advantages of this saddle, besides the conveniences of adjustment already described, are, first, the entire device is sustained by a spring or springs, which are fixed about under the center of gravity of the rider and are free at the front and rear, so that the seat has a spring-rocking motion, which prevents the direct vertical jar which is experienced when the seat is suspended, even upon springs, at the front and rear; second, the link-connection from the rear stretcher to the rear spring allows an oscillating movement, which is further controlled and guided horizontally by the bearing of the extension on the forward spring-support, and said oscillating movement will relieve the springs of very much of the strain and the rider of much of the jar occasioned by obstructions, which tend to check the forward movement of the bicycle and to throw the rider forward; third, the forward extension of the rear stretcher having a sliding bearing under the seat prevents the said stretcher from turning on its pivot at the link, or its connection with the spring if it were directly connected, and causes that the weight of the rider tends to stretch the seat very much as if the rear stretcher were pivoted below the forward part of the seat, and not merely to sag it at the middle, as if it were suspended directly at the two ends; and this advantage is still further increased by the link-connection from the stretcher to the rear spring.

For the flexible seat B, I prefer to employ leather, which is pressed into corrugated form, as shown in Figs. 4 and 5, the corrugations $b$ radiating from the front or nose toward the curved rear. I prefer, also, that the corrugations should not extend to the edges, but should terminate, as shown, inside the edge all around. These corrugations should be curved in cross-section, so as not to leave square or sharp corners at the surface. These corrugations serve the purpose of ventilation as well as the slits or perforations sometimes employed, and instead of weakening the seat, as do the slits and perforations, they strengthen it by stiffening it.

I claim—

1. In combination, substantially as set forth, the flexible suspension-seat fastened to its support at the forward end, the rear stretcher or seat-frame having a forward extension resting upon the support under the seat, and a spring additionally supporting the rear stretcher.

2. In combination, substantially as set forth, the flexible suspension-seat fastened to its support at the forward end, the rear stretcher or seat-frame having a forward extension resting upon the support underneath the seat, and a spring supporting the rear stretcher jointed to it below the seat.

3. In combination, substantially as set forth, the flexible suspension-seat fastened to its support at the forward end, the rear stretcher or seat-frame having a forward extension resting upon the support underneath the seat, and a spring supporting the rear stretcher and connected to it by a link pivoted to the stretcher below the seat and extending rearward to the spring.

4. In combination, substantially as set forth, the rear stretcher, the spring $C^2$, and the link E, pivoted to the spring and to the stretcher, and having the extension E' stopped against the stretcher at its highest point.

5. In combination, substantially as set forth, the rear stretcher having a forward extension supported underneath the seat, the spring $C^2$, and the link E, pivoted to the spring and to the rear stretcher and having the extension E', stopped against the stretcher.

6. In combination, substantially as set forth, the flexible suspended seat, the spring which supports its forward end extended back underneath it, and the frame or rear stretcher attached to the seat and extended forward underneath it and resting on the rearwardly-extended spring, whereby the seat, when sagged at the middle, is directly supported at that part by the forward spring.

7. In combination, substantially as set forth, the front spring and the front stretcher pivoted to it, the rear spring and the rear stretcher connected to it by a link and having the forward extension resting on the forward spring underneath the seat, and the flexible seat suspended from the front stretcher to the rear stretcher.

8. In combination, substantially as set forth, the perch, the seat-support, and a clamp which secures them together, the portion of the support embraced in the clamp being formed in a curve of short radius and the support being adjustable by sliding said curved portion in its bearings in the clamp to change the inclination of the seat at will.

9. In combination, substantially as set forth, the perch, the seat-support, and the two clamps which secure them together, the portion of the support embraced in the clamps being formed in a curve of short radius and the clamps being independently adjustable on the perch.

10. In combination, substantially as set forth, the perch, the seat-support, and a clamp which unites them, the support having a portion formed in a curve of short radius adjustable in the clamp, and the clamp being adjustable on the perch, whereby the change of inclination and the change of position may be independently effected at will.

11. The flexible saddle-seat suspended at the ends and corrugated from front to rear, substantially as and for the purpose set forth.

In testimony whereof I have hereunto set my hand, in the presence of two witnesses, at Chicago, Illinois, this 12th day of April, A. D. 1886.

THOS. B. JEFFERY.

Attest:
 CHAS. S. BURTON,
 CHAS. S. NEEVOS.